UNITED STATES PATENT OFFICE.

WILLIAM FRIEND, OF NEW YORK, N. Y.

METHOD OF UTILIZING RUBBER FOR ERASIVE PURPOSES.

SPECIFICATION forming part of Letters Patent No. 443,614, dated December 30, 1890.

Application filed July 22, 1889. Serial No. 318,313. (No specimens.)

*To all whom it may concern:*

Be it known that I, WILLIAM FRIEND, of the city, county, and State of New York, a citizen of the United States, have invented an Improved Method of Utilizing India-Rubber for Erasive Purposes, of which the following is a full, clear, and exact specification.

My invention relates to the use of india-rubber for the purpose of effecting erasures of lead-pencil marks, &c., from the surface of paper, &c.; and my invention consists in the method of utilizing india-rubber for such erasive purposes, which consists in creating a condition of substantially uniform tension throughout the entire mass of the rubber and uniformly supporting and permanently holding in its said tense condition said rubber mass throughout its entire area fixedly by and upon a rigid foundation, substantially as hereinafter set forth.

Heretofore in fabricating india-rubber erasers the rubber has had mixed with it various substances—such, for example, as powdered glass, emery, zinc-white, &c.—in order to give the eraser the requisite firmness or stiffness to adapt it to its use. When a mass of india-rubber which is substantially pure is put in a condition of tension, it becomes more or less stiff and firm in proportion to the degree of the tension created in the mass.

In carrying out my invention, therefore, I take the mass of substantially pure india-rubber which is to constitute the eraser, and I create in it a condition of tension which is substantially equal or uniform throughout the entire mass. I then uniformly support and permanently hold the said entire mass in said tense condition fixedly upon a rigid foundation or support. This may be accomplished by stretching or clamping the entire rubber mass uniformly upon or over or around a block or piece of wood, metal, or analogous rigid substance of corresponding area and conformable outline or shape on its supporting-surface.

It is essential to my invention that the entire mass of the rubber should be given tension, and that the entire tense mass should be uniformly supported and permanently held fixedly upon its rigid support, as thereby a uniform stiffness throughout the mass is established and maintained. When the india-rubber is thus made and held tense, as set forth, the edges of the minute cells of which the mass is composed are exposed and rendered sharp, thereby giving to the exposed face or faces of the mass a surface which is peculiarly adapted to establish effective contact with pencil and analogous marks on the paper cover and upon which the eraser is passed and to remove or obliterate such marks from the paper with but slight friction of the eraser thereon.

When india-rubber has mixed with it the foreign substances hereinbefore named for the purpose of producing rigidity, the presence of such substances tends to soil and often to wholly destroy the surface of the paper to which it is applied in making erasures. By means of my invention I am enabled to fabricate an eraser of approximately pure india-rubber, which will rapidly remove marks from a paper-surface, and which in effecting erasures will cause a minimum of damage to such paper-surface.

I am aware that a tubular piece of rubber has been held to place upon and prevented from longitudinal movement or displacement on a cylindrical support by means of an annular rib or projection on the support, which distends a portion only of the rubber tube—to wit, that portion that surrounds the rib or projection; but in such case only a portion of the rubber mass which constitutes the rubber tube is initially distended, the remainder of the tube being left in normal condition—that is to say, in a non-tensioned state—and with the tube ends unconfined, and thus free to move on the support. Under such conditions the initial tension created in that portion of the rubber distended by the rib will not be permanent even in such portion, owing to the nature and characteristics of the rubber itself, said tension being by molecular action in the rubber mass gradually destroyed or distributed throughout the entire mass until the initially-distended portion becomes hardened, and hence useless for erasive purposes, or the entire tube assumes a practically non-tensioned condition. I make no claim herein, broadly, therefore, to the creation of tension in india-rubber; but I intend to make my claim to creating a condition of substantially uniform tension throughout an entire mass of rubber and then uniformly supporting and permanently holding in its said tense condition said rubber mass throughout its entire area fixedly by and upon a rigid foundation, whereby the entire tensioned mass of the rubber is maintained in a condition wherein the entire area of its exposed face is given the described advantages for erasive purposes.

What I claim as my invention, and desire to secure by Letters Patent, is—

The method of utilizing india-rubber for erasive purposes, which consists in creating a condition of substantially uniform tension throughout the entire mass of the rubber and uniformly supporting and permanently holding in its said tense condition said rubber mass throughout its entire area fixedly by and upon a rigid foundation, substantially as and for the purpose set forth.

WILLIAM FRIEND.

Witnesses:
H. E. HOLMES,
F. W. CROCKER.